United States Patent
Jacques et al.

(10) Patent No.: US 12,438,451 B2
(45) Date of Patent: Oct. 7, 2025

(54) POWER CONVERTER, CONTROLLER, AND METHODS

(71) Applicant: REDISEM LTD., Hong Kong (CN)

(72) Inventors: Russell Jacques, Shatin (HK); David Coulson, Shatin (HK)

(73) Assignee: Redisem LTD., Shatin (HK)

( * ) Notice: Subject to any disclaimer, the term of this patent is extended or adjusted under 35 U.S.C. 154(b) by 133 days.

(21) Appl. No.: 18/002,047

(22) PCT Filed: Jun. 16, 2020

(86) PCT No.: PCT/CN2020/096411
§ 371 (c)(1),
(2) Date: Dec. 15, 2022

(87) PCT Pub. No.: WO2021/253243
PCT Pub. Date: Dec. 23, 2021

(65) Prior Publication Data
US 2023/0246543 A1    Aug. 3, 2023

(51) Int. Cl.
*H02M 3/157* (2006.01)
*H02M 1/00* (2006.01)
*H02M 1/42* (2007.01)

(52) U.S. Cl.
CPC ....... *H02M 1/4258* (2013.01); *H02M 1/0019* (2021.05); *H02M 3/157* (2013.01)

(58) Field of Classification Search
CPC ... H02M 1/4258; H02M 1/0019; H02M 3/157
See application file for complete search history.

(56) References Cited

U.S. PATENT DOCUMENTS

| | | | |
|---|---|---|---|
| 9,496,797 B2* | 11/2016 | Panov | H02M 1/40 |
| 10,581,325 B1* | 3/2020 | Munroe | H02M 1/08 |
| 2007/0159141 A1 | 7/2007 | Shih | |
| 2022/0294330 A1* | 9/2022 | Huang | H02M 3/158 |

FOREIGN PATENT DOCUMENTS

| | | | |
|---|---|---|---|
| CN | 201919225 U | 8/2011 | |
| CN | 202696950 U | 1/2013 | |
| CN | 103683894 A | 3/2014 | |
| CN | 103763830 A | 4/2014 | |
| CN | 105406697 A | 3/2016 | |
| CN | 105515418 A | 4/2016 | |
| CN | 108604861 A | 9/2018 | |
| EP | 2704531 A2 * | 3/2014 | H02M 1/4258 |

* cited by examiner

*Primary Examiner* — Adolf D Berhane
(74) *Attorney, Agent, or Firm* — LaMorte & Associates P.C.

(57) ABSTRACT

A power converter comprising an active power factor correction (APFC) circuit. A first compensation circuit provides a first compensation signal to the APFC circuit. A second compensation circuit provides a second compensation signal to the APFC circuit. A load demand sensing circuit receives a load demand signal to switch on the second compensation circuit to provide the second compensation signal. There is also provided a controller for a power converter, with the controller comprising a first compensation circuit for providing a first compensation signal to an active power factor correction (APFC) circuit, and a second compensation circuit for providing a second compensation signal to the APFC circuit. The controller also comprises a load demand sensing circuit for receiving a load demand signal to switch on the second compensation circuit to provide the second compensation signal.

17 Claims, 9 Drawing Sheets

POWER CONVERTER, CONTROLLER, AND METHODS

FIELD OF THE INVENTION

The invention relates to power converters, controllers for power converters, and methods of converting power and of controlling power conversion. The invention particularly relates to power converters with active power factor correction (APFC) control circuits that are exposed to transient changes in load conditions of an attached DC-DC converter. The invention has been described for use with power supplies and light emitting diode (LED) drivers, but the invention is not limited to these particular applications.

BACKGROUND OF THE INVENTION

Active power factor correction (APFC) circuits (also known as pre-regulators) are used ubiquitously in power converters in order to control input power factor and harmonics emissions in line with statutory EMC and FCC regulations. These APFC circuits are normally placed between an input bridge rectifier and an output DC-DC converter, boosting the rectified AC input to provide a regulated high tension (HT) output. Such topologies are generally referred as "two-stage power converters". The control loop of the APFC controller is typically designed to have a very slow response to line and load changes, which has the undesirable effect of causing a large peak or trough in the HT rail when there is a load step on the DC-DC output, as occurs at start-up, for example.

One way of working around this is to design the DC-DC converter to have a wide input voltage range, but this negatively impacts costs and efficiency. Another costly solution is to increase the size of the HT rail capacitor. Yet another solution is to compromise the DC-DC converter response to ensure that its load demand cannot change quickly. Prior circuits exist which modify the speed of the APFC control loop in response to the voltage of the HT rail. However, the additional circuitry required to implement this method includes an accurate comparator and reference voltage, significantly increasing the costs and thereby reducing the benefits.

It is an object of the present invention to overcome or ameliorate at least one of the disadvantages of the prior art, or to provide a useful alternative.

It is an object of at least some embodiments of the present invention to provide lower cost methods of modifying the speed of an APFC control loop to substantially reduce the large voltage peaks and troughs in the HT rail voltage that occur when there is a load step on the DC-DC output.

SUMMARY OF THE INVENTION

Embodiments of the present invention in a first aspect provide a power converter comprising:
   an active power factor correction (APFC) circuit;
   a first compensation circuit for providing a first compensation signal to the APFC circuit;
   a second compensation circuit for providing a second compensation signal to the APFC circuit; and
   a load demand sensing circuit for receiving a load demand signal to switch on the second compensation circuit to provide the second compensation signal.

Embodiments of the present invention in a second aspect provide a LED lighting apparatus having a power converter as described above.

Embodiments of the present invention in a third aspect provide a controller for a power converter, the controller comprising:
   a first compensation circuit for providing a first compensation signal to an active power factor correction (APFC) circuit;
   a second compensation circuit for providing a second compensation signal to the APFC circuit; and
   a load demand sensing circuit for receiving a load demand signal to switch on the second compensation circuit to provide the second compensation signal.

Embodiments of the present invention in a fourth aspect provide a method of controlling a power converter having an active power factor correction (APFC) circuit, the method comprising:
   providing a first compensation signal to the APFC circuit;
   providing a second compensation signal to the APFC circuit upon receipt of a load demand signal.

Other features and embodiments of the present invention can be found in the appended claims.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

BRIEF DESCRIPTION OF THE FIGURES

The accompanying figures include the following figures depicting the prior art.

Preferred embodiments in accordance with the best mode of the present invention will now be described, by way of example only, with reference to the accompanying figures listed below, in which the same reference numerals, names, or other reference labels refer to like parts throughout the figures listed below unless otherwise specified, and in which.

For completeness, the reference numerals, names, or other reference labels indicated in FIGS. 1 to 4 and FIG. 8, which all depict prior art, do not correspond to any of the reference numerals, names, or other reference labels indicated in the remaining figures, which depict embodiments of the present invention, unless otherwise specified.

DETAILED DESCRIPTION OF PREFERRED EMBODIMENTS OF THE INVENTION

With reference to FIGS. 5 to 7 and FIG. 8, there is provided a power converter 1 comprising an active power factor correction (APFC) circuit 2. A first compensation circuit 3 provides a first compensation signal to the APFC circuit 2. A second compensation circuit 4 provides a second compensation signal to the APFC circuit 2. A load demand sensing circuit 5 receives a load demand signal 6 to switch on the second compensation circuit 4 to provide the second compensation signal.

Figure 5:
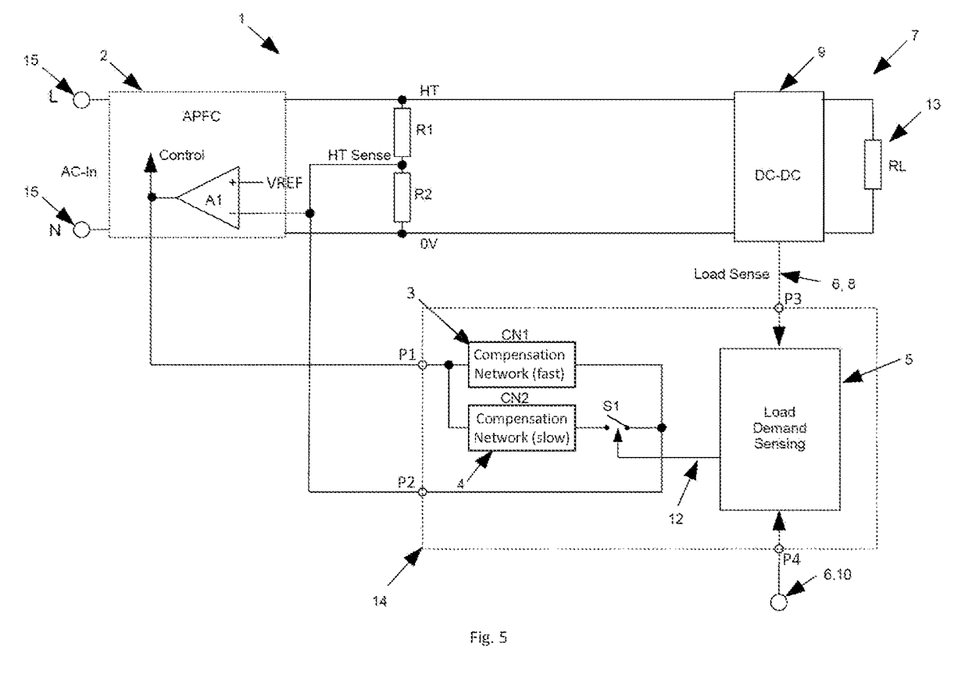
FIG. 5 is a schematic diagram of a power converter in accordance with an embodiment of the present invention.
Figure 6:
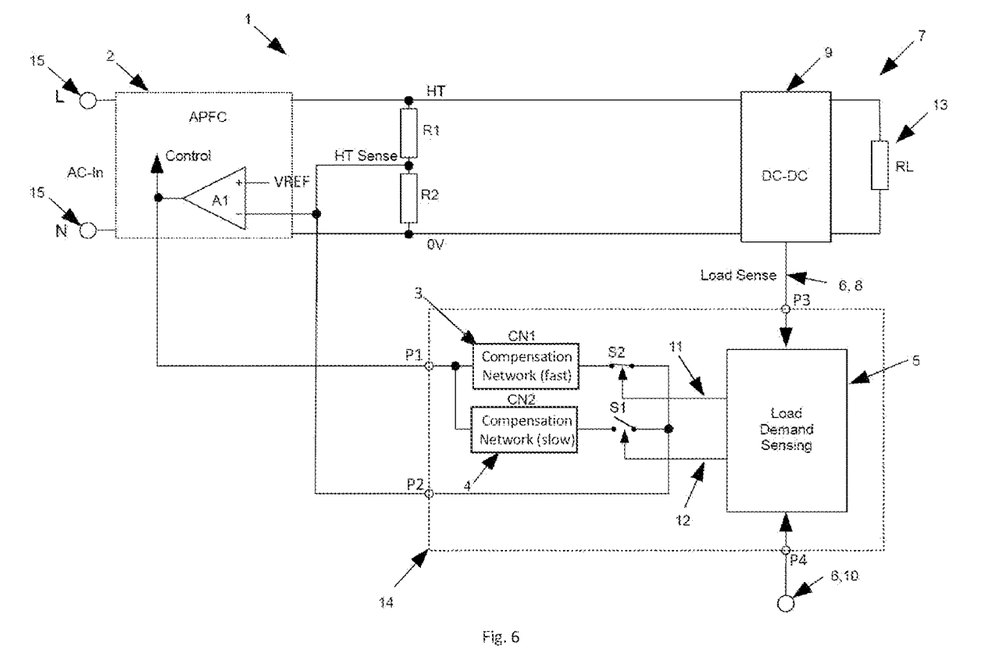
FIG. 6 is a schematic diagram of a power converter in accordance with another embodiment of the present invention.
Figure 7:
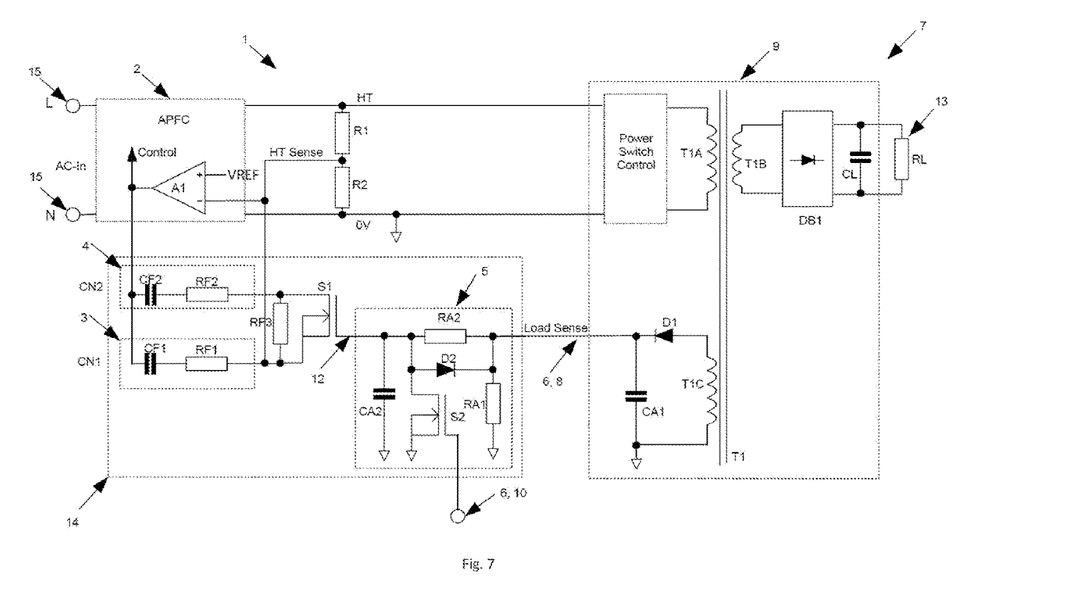
FIG. 7 is a schematic diagram of a power converter in accordance with a further embodiment of the present invention.

The APFC circuit 2 is connected to a load circuit 7 and the load demand signal 6 is a load sense signal 8 derived from the load circuit 7. Typically, the load sense signal 8 indicates a transient load condition.

In typical embodiments, the load circuit 7 comprises a DC-DC converter circuit 9.

The load demand signal 6 can also take the form of a load change request signal 10. One or both of the load sense signal 8 and the load change request signal 10 can exist and be provided to the load demand sensing circuit 5.

The load change request signal 10 can be, for example, provided by an external controller.

In some embodiments, as best shown in FIG. 6, the load demand sensing circuit 5 receives one or more of the load demand signals 6 to also switch on the first compensation circuit 3 to provide the first compensation signal. The load demand sensing circuit 5 receives one or more of the load demand signals 6 and provides a first switching signal 11 to switch the first compensation circuit 3 on or off and a second switching signal 12 to switch the second compensation circuit 4 on or off. In some cases, the first switching signal 11 is an inverted form of the second switching signal 12.

To avoid or minimize possible instability, the second compensation circuit 4 can be switched on following a timing delay after the first compensation circuit 3 is switched on. For example, the timing delay can be greater than or equal to 10 ms. That is, the first compensation circuit 3 is switched on instantaneously whilst switching on the second compensation circuit 4 is delayed by, for example, 10 ms.

In other embodiments, as best shown in FIG. 5, the first compensation circuit 3 continuously provides the first compensation signal to the APFC circuit 2. For example, instead of a switched connection with the APFC circuit 2, the first compensation circuit 3 has a short-circuit connection with the APFC circuit 2.

The second compensation signal provided by the second compensation circuit 4 gives a normal control response and the first compensation signal provided by the first compensation circuit 3 gives a faster control response. For example, the second compensation signal provides a control response with a closed bandwidth of 7 Hz, and the first compensation signal provides a control response with a closed bandwidth of 70 Hz.

In another aspect, embodiments of the present invention provide a LED (light emitting diode) lighting apparatus having the power converter 1 described above. The load circuit 7 can comprise one or more LEDs 13.

Embodiments of the present invention include those in the form of a controller 14 for a power converter. The controller 14 comprises a first compensation circuit 3 for providing a first compensation signal to an active power factor correction (APFC) circuit 2, and a second compensation circuit 4 for providing a second compensation signal to the APFC circuit 2. The controller 14 also comprises a load demand sensing circuit 5 for receiving a load demand signal 6 to switch on the second compensation circuit 4 to provide the second compensation signal.

All of or parts of the circuits described above can be formed of discrete components or integrated together in the form of, for example, a semiconductor chip. As a more specific example, the controller 14 can be in the form of a semiconductor chip. In this example, the controller 14 can have a first terminal P1, a second terminal P2, a third terminal P3, and a fourth terminal P4. The first and second terminals P1 and P2 are for connecting the first and second compensation circuits 3 and 4 to the APFC circuit 2. The third terminal P3 is for receiving the load sense signal 8, and the fourth terminal is for receiving the load change request signal 10. In another example, the controller 14 together with the APFC circuit 2 and/or the DC-DC converter 9 can take the form of a semiconductor chip.

In a further aspect, embodiments of the present invention provide a method of controlling a power converter 1 having an active power factor correction (APFC) circuit 2. The method comprises: providing a first compensation signal to the APFC circuit 2; and providing a second compensation signal to the APFC circuit 2 upon receipt of a load demand signal 6. Embodiments of the present invention also provide a method of converting power, with the method comprising: receiving an alternating current (AC) input power 15 with an active power factor correction (APFC) circuit 2; providing a first compensation signal to the APFC circuit 2; and providing a second compensation signal to the APFC circuit 2 upon receipt of a load demand signal 6. The method typically also comprises converting the input power 15 with DC-DC conversion after it passes through the APFC circuit 2. After DC-DC conversion, the input power is then provided to a load 13. The load demand signal 6 can be derived from DC-DC conversion circuit and/or the load.

Embodiments of the present invention provide low-cost methods for improving the transient line and load performance of a two-stage power converter, achieved by modifying the control loop in response to observed changes in the load voltage and/or current.

Figure 1:
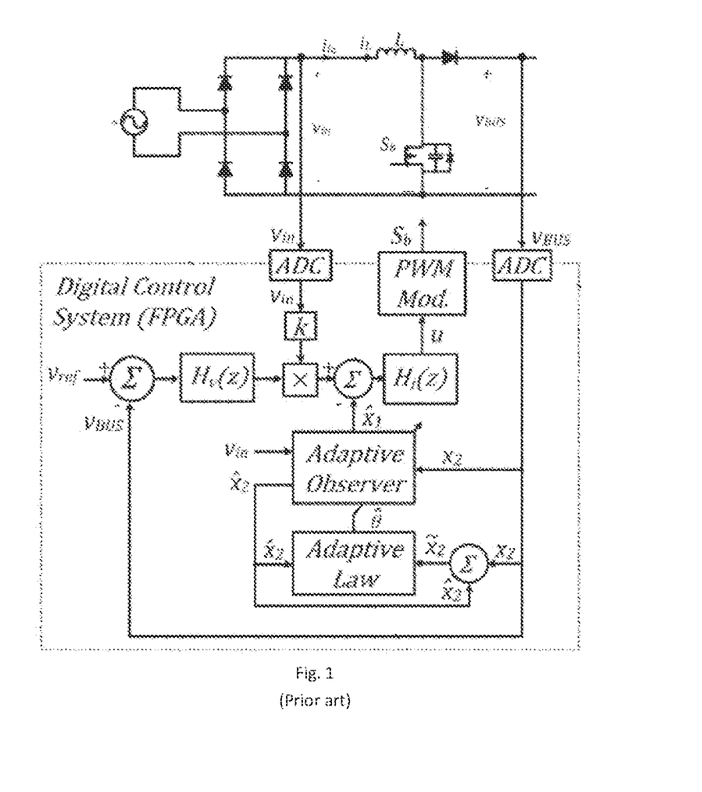
FIG. 1 is a prior circuit described in U.S. Pat. No. 9,325,235.
Figure 2:
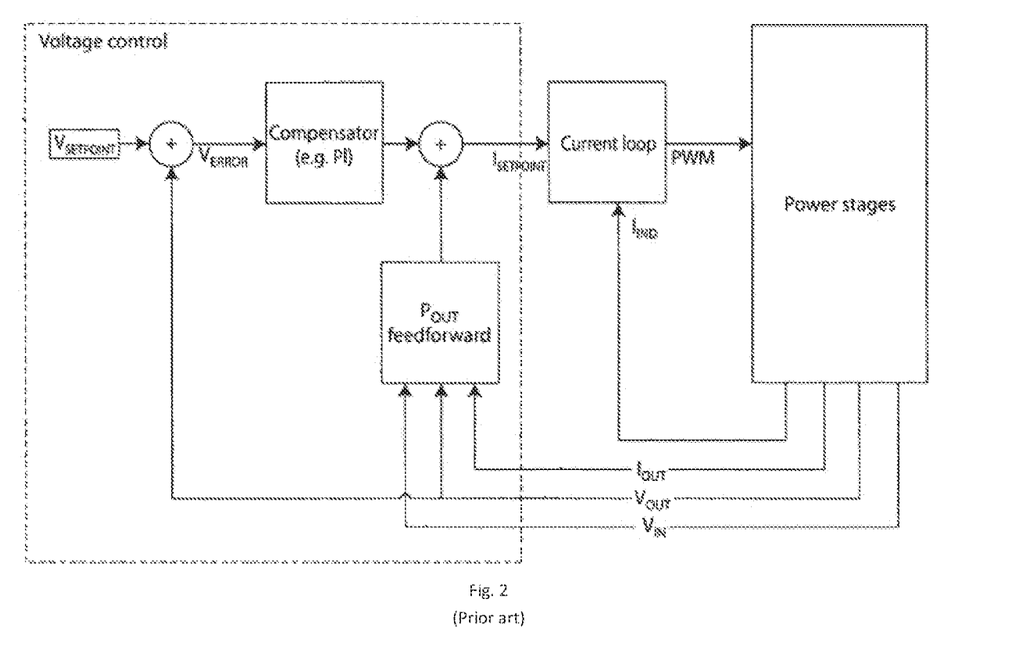
FIG. 2 is a prior circuit described in U.S. Pat. No. 9,812,951.
Figure 3:
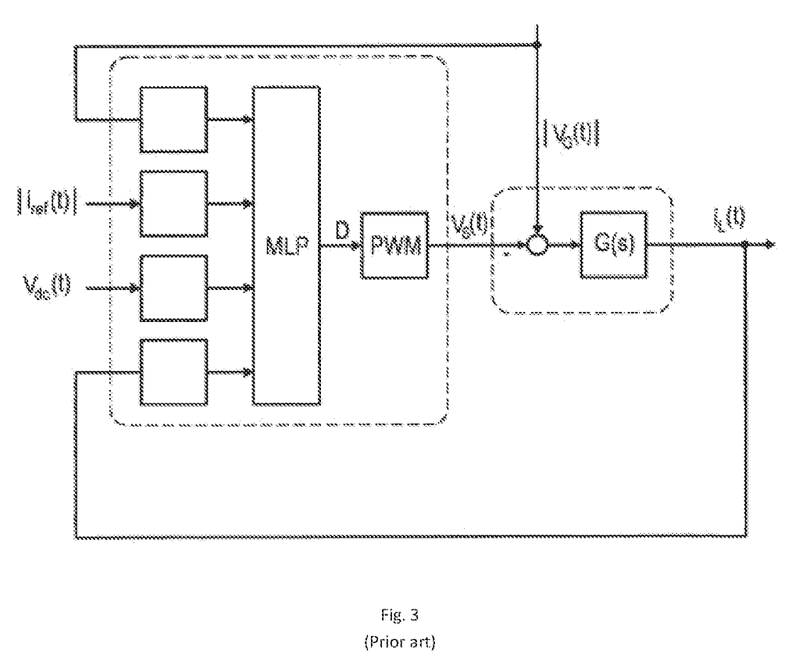
FIG. 3 is a prior circuit described in WO 2016096887.
Figure 4:
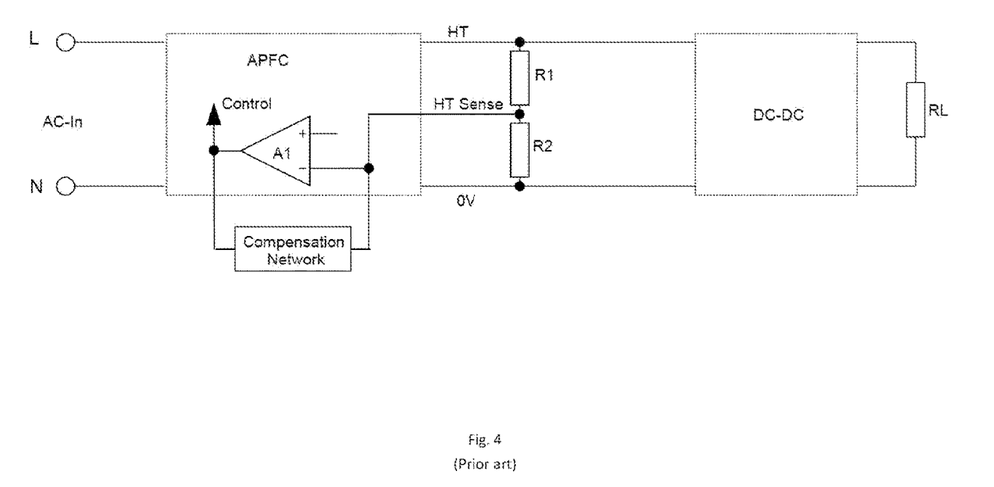
FIG. 4 is schematic diagram of a typical two-stage power converter, comprising an active power factor correction (APFC) input stage and a DC-DC converter output stage.
Figure 8:
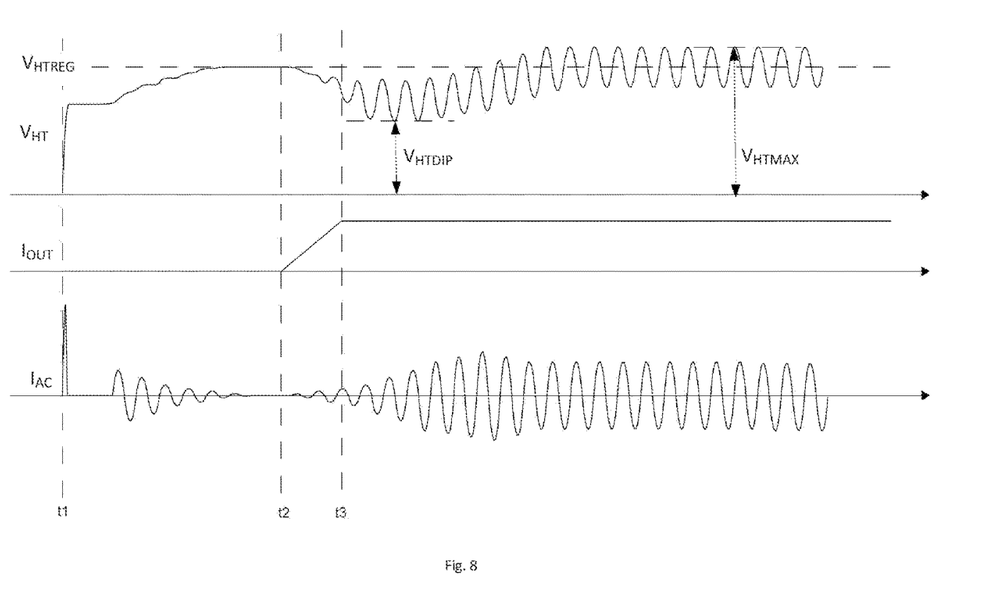
FIG. 8 are typical waveforms in respect of the power converter of FIG. 4 at start-up.

In further detail, the APFC control loop in typical two-stage power converters, such as that depicted in FIG. 4, have a very slow control loop response, having a typical closed-loop bandwidth in the range 5 to 10 Hz. This slow response causes difficulties at start-up and also subsequently with sharp changes in output load. FIG. 8 shows typical start-up waveforms for such a system, in which the boosted HT voltage dips considerably (to voltage $V_{HTDIP}$) when the output DC-DC converter starts drawing power. $V_{HTDIP}$, along with $V_{HTMAX}$, are critical design parameters, as these define the required input range of the DC-DC converter.

The value of $V_{HTDIP}$ can be significantly improved by increasing the closed-loop bandwidth of the APFC control loop, as this has the effect of reducing the HT ripple voltage. However, this also has the effect of reducing the input PF and increasing the harmonic emissions. Prior circuits seek to achieve both high power factor and good response by monitoring the APFC input and output voltages with a feedforward/feedback control strategy.

The PF and harmonics emissions regulations are ignored for start-up and load step transients, being applicable for steady-state conditions only. Embodiments of the present invention take advantage of this to use a simpler and lower cost method as described above and in further detail below.

Referring to FIG. 6, the load demand sensing circuit 5 monitors the load sense signal 8 and the load change request signal 10 to determine whether to change the control loop from slow mode (slow or normal control response) to fast mode (fast control response). The load sense signal 8 can be derived from or responsive to the load voltage, the load current or the load power of the load circuit 7. The load change request signal 10 can be generated by an external controller, such as a microcomputer (MCU) when there will be a substantial change in output power for example when a dimming LED driver substantially changes the dim level. The switches S1, S2 select one of two available loop compensation networks, that is, the first compensation circuit 3 and the second compensation circuit 4, to give either a normal (slow) control response (for steady-state conditions) or a faster control response for handling short-term transients. For example, the normal loop compensation network (the second compensation circuit 4) can give a closed bandwidth of 7 Hz, while the fast loop compensation network (the first compensation circuit 3) can provide a 70 Hz bandwidth.

The criteria for detecting a transient load condition are determined by consideration of the specific requirements of each application. The load sense signal 8 can be responsive to the load voltage, the load current, or the load power of the load circuit 7. Advantageously, a transient load condition would be detected when starting up. In addition, an external microcomputer (MCU) can send a load change request signal 10 in advance of a change in dim level, forcing the load demand sensing circuit 5 to select the fast mode (through the first compensation circuit 3).

To avoid possible instability, the fast/slow switching timing is preferably asymmetric, where switching into fast mode is instantaneous, whereas switching into the slow (normal) mode is delayed, typically for >10 ms.

Figure 9:
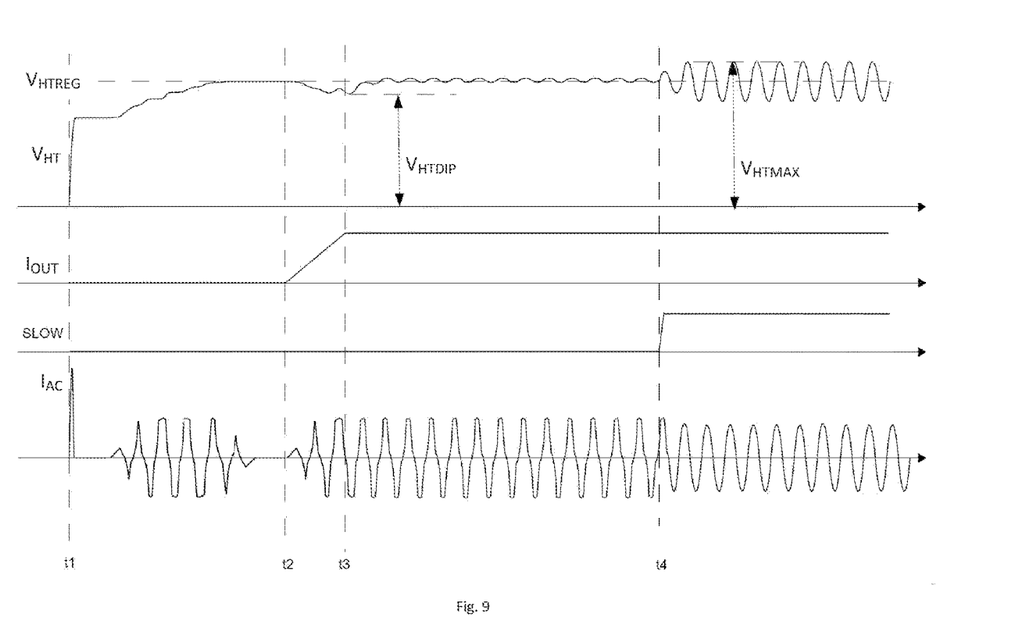
FIG. 9 are typical waveforms in respect of the power converter of FIG. 5 at start-up.

The improved startup waveforms resulting from embodiments of the present invention, given in FIG. 9, can be directly compared with the waveforms in FIG. 8 which are in respect of prior circuits. In particular, the variations in the HT voltage after start-up are greatly reduced, as indicated by $V_{HTDIP}$ and $V_{HTMAX}$.

The switching arrangement of FIG. 6 can be simplified with negligible compromise by replacing switch S2 with a short-circuit, as shown in FIG. 5.

To avoid unpredictable steps in the control loop, it is advantageous to connect a resistor across each switch to ensure that the capacitor in each compensation loop is appropriately charged while the switch is open. Preferably, a high value resistor is connected across each switch.

A schematic diagram of a simple implementation for an isolating constant current (CC) LED driver in accordance with embodiments of the present invention is given in FIG. 7. The transient load condition detected in this case is a low load voltage, such as occurs at start-up or load reconnection. The load voltage is sensed by the Load Sense voltage (load sense signal 8), which mirrors the load voltage via transformer T1. When load sense signal 8 is high enough to turn on NMOS switch S1, loop compensation network CF2, RF2 is switched into the circuit, dominating the feedback for amplifier A1. Capacitor CA2 and RA2 provide a time-delay for switching into normal (slow) mode. Diode D2 and RA1 provide a fast reset into fast mode if the load voltage drops below a threshold determined by the transformer turns ratio, VREF and the NMOS turn-on voltage. At start-up, capacitors CA1, CA2 are discharged, MOSFET S1 is off and the feedback network comprises only CN1 (RF1 and CF1), providing a fast control loop response. After the load voltage has risen to a pre-determined threshold, the reflected voltage on CA1 is enough to turn on S1, after a time delay determined by RA2, CA2. With S1 turned on, the feedback network CN2 (RF2 and CF2) is switched in parallel with CN1, selecting a slow loop response.

In the case of a digital dimming driver where a control microprocessor might be used, in the event of a significant predicted load change, the microprocessor can provide a load change request signal to directly control S1.

Looking at the APFC control loop in further detail, the APFC circuit 2 generates an HT supply by boosting the rectified line voltage. R1 and R2 provide a voltage sense signal enabling an APFC controller (i.e. the APFC circuit 2) to regulate the HT supply voltage.

The APFC circuit 2 typically utilizes a proportional-integral (PI) control loop. This can be described by the equation below:

$$G(s) = K_P + \frac{K_i}{s}$$

When the fast compensation network (the first compensation circuit 3) is selected, the constants $K_p$ and $K_i$ depend upon the fast compensation network components:

$$K_p = RF1/R1 \qquad <1a>$$

$$K_i = 1/R1 \cdot CF1 \qquad <1b>$$

When the slow compensation network (the second compensation circuit 4) is selected, and switch S2 is provided, the constants $K_p$ and $K_i$ depend upon the slow compensation network components:

$$K_p = RF2/R1 \qquad <2a>$$

$$K_i = 1/R1 \cdot CF2 \qquad <2b>$$

When the slow compensation network (the second compensation circuit 4) is selected, and switch S2 is not provided, the constants $K_p$ and $K_i$ depend upon the combined impedances of the fast and slow compensation network components. When combined, the impedance of the slow compensation network is dominant, being typically a tenth of the fast compensation network, so that the values of $K_p$ and $K_i$ are approximated by equations 2a, 2b above.

It is appreciated that the aforesaid embodiments are only exemplary embodiments adopted to describe the principles of the present invention, and the present invention is not merely limited thereto. Various variants and modifications can be made by those of ordinary skill in the art without departing from the spirit and essence of the present invention, and these variants and modifications are also covered within the scope of the present invention. Accordingly, although the invention has been described with reference to specific examples, it is appreciated by those skilled in the art that the invention can be embodied in many other forms. It is also appreciated by those skilled in the art that the features of the various examples described can be combined in other combinations. In particular, it is appreciated by those skilled in the art that there are different variations of the circuits described above within the scope of the present invention. There are many possible permutations of the circuit arrangements described above which are appreciated by those skilled in the art. Accordingly, the circuit components shown in the embodiments can be interchanged freely, placed in different arrangements or order, but still provide the functionality described in respect of the circuit as originally arranged or ordered in the described embodiments, and therefore, still falling within the scope of the present invention.

The invention claimed is:

1. A power converter comprising:
   an active power factor correction (APFC) circuit;

a first compensation circuit for providing a first compensation signal to the APFC circuit;

a second compensation circuit for providing a second compensation signal to the APFC circuit; and a load demand sensing circuit for receiving a load demand signal to switch on the second compensation circuit to provide the second compensation signal, wherein the load demand signal is a load change request signal.

2. The power converter according to claim 1 wherein the APFC circuit is connected to a load circuit and the load demand signal is a load sense signal derived from the load circuit.

3. The power converter according to claim 2 wherein the load sense signal indicates a transient load condition.

4. The power converter according to claim 2 wherein the load circuit comprises a DC-DC converter circuit.

5. The power converter according to claim 1 wherein the load change request signal is provided by an external controller.

6. The power converter according to claim 1 wherein the load demand sensing circuit receives the load demand signal to switch on the first compensation circuit to provide the first compensation signal.

7. The power converter according to claim 6 wherein the load demand sensing circuit receives the load demand signal and provides a first switching signal to switch the first compensation circuit on or off and a second switching signal to switch the second compensation circuit on or off.

8. The power converter according to claim 7 wherein the first switching signal is an inverted form of the second switching signal.

9. The power converter according to claim 6 wherein the second compensation circuit is switched on following a timing delay after the first compensation circuit is switched on.

10. The power converter according to claim 9 where the timing delay is greater than or equal to 10 ms.

11. The power converter according to claim 1 wherein the first compensation circuit continuously provides the first compensation signal to the APFC circuit.

12. The power converter according to claim 1 wherein the second compensation signal gives a normal control response and the first compensation signal gives a faster control response.

13. The power converter according to claim 12 wherein the second compensation signal provides a control response with a closed bandwidth of 7 Hz.

14. The power converter according to claim 12 wherein the first compensation signal provides a control response with a closed bandwidth of 70 Hz.

15. A LED lighting apparatus having a power converter according to claim 1.

16. A controller for a power converter, the controller comprising:

a first compensation circuit for providing a first compensation signal to an active power factor correction (APFC) circuit;

a second compensation circuit for providing a second compensation signal to the APFC circuit; and a load demand sensing circuit for receiving a load demand signal to switch on the second compensation circuit to provide the second compensation signal, wherein the load demand signal is a load change request signal.

17. A method of controlling a power converter having an active power factor correction (APFC) circuit, the method comprising:

providing a first compensation signal to the APFC circuit;

providing a second compensation signal to the APFC circuit upon receipt of a load demand signal, wherein the load demand signal is a load change request signal.

* * * * *